(12) United States Patent
Simske et al.

(10) Patent No.: US 8,332,949 B2
(45) Date of Patent: Dec. 11, 2012

(54) METHODS FOR MAKING AN AUTHENTICATING SYSTEM FOR AN OBJECT

(75) Inventors: Steven J. Simske, Fort Collins, CO (US); Henry W. Sang, Jr., Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1750 days.

(21) Appl. No.: 11/414,113

(22) Filed: Apr. 28, 2006

(65) Prior Publication Data
US 2007/0256136 A1    Nov. 1, 2007

(51) Int. Cl.
*G06F 7/04* (2006.01)

(52) U.S. Cl. .......................................... 726/26; 713/167

(58) Field of Classification Search ............. 726/26, 726/22; 705/14, 26–27; 713/167, 185
See application file for complete search history.

(56) References Cited

U.S. PATENT DOCUMENTS

| | | | | |
|---|---|---|---|---|
| 4,983,817 A * | 1/1991 | Dolash et al. | ............. | 235/462.04 |
| 5,367,148 A * | 11/1994 | Storch et al. | .................. | 235/375 |
| 5,524,758 A | 6/1996 | Lupul | | |
| 6,745,027 B2 * | 6/2004 | Twitchell, Jr. | ............. | 455/422.1 |
| 6,825,766 B2 * | 11/2004 | Hewitt et al. | ............... | 340/572.7 |
| 6,850,592 B2 | 2/2005 | Schramm et al. | | |
| 7,053,775 B2 * | 5/2006 | Moore | ........................ | 340/572.1 |
| 7,322,514 B2 * | 1/2008 | Lubow | ............... | 235/375 |
| 7,423,534 B2 * | 9/2008 | Dhanjal et al. | ............. | 340/572.1 |
| 2003/0050871 A1 * | 3/2003 | Broughton | ....................... | 705/28 |
| 2003/0141358 A1 * | 7/2003 | Hudson et al. | ................ | 235/375 |
| 2004/0227630 A1 * | 11/2004 | Shannon et al. | .......... | 340/539.22 |
| 2004/0232218 A1 * | 11/2004 | Graham | ......................... | 235/379 |
| 2005/0038710 A1 * | 2/2005 | Zimmerman et al. | ........... | 705/26 |
| 2005/0065645 A1 * | 3/2005 | Liff et al. | ....................... | 700/241 |
| 2005/0127176 A1 * | 6/2005 | Dickinson et al. | ............ | 235/385 |
| 2006/0005027 A1 * | 1/2006 | Tseng | ............................. | 713/176 |
| 2006/0081713 A1 * | 4/2006 | Carrender | ................ | 235/462.46 |
| 2007/0164862 A1 * | 7/2007 | Dhanjal et al. | ............. | 340/572.1 |

OTHER PUBLICATIONS

U.S. Appl. No. 10/961,949, filed Oct. 8, 2004, Simske et al.
U.S. Appl. No. 11/076,533, filed Mar. 8, 2005, Simske et al.
U.S. Appl. No. 11/076,534, filed Mar. 8, 2005, Simske et al.
U.S. Appl. No. 11/192,878, filed Jul. 29, 2005, Simske et al.

* cited by examiner

*Primary Examiner* — Eleni Shiferaw
*Assistant Examiner* — Abu Sholeman

(57) ABSTRACT

A method for making an authenticating system for a package includes establishing a plurality of variable instruments on the package and depositing a product in the package after the instruments have been established thereon. The method also includes acquiring information from at least two of the plurality of instruments, and associating the acquired information with the product to render product-specific authentication data.

23 Claims, 2 Drawing Sheets

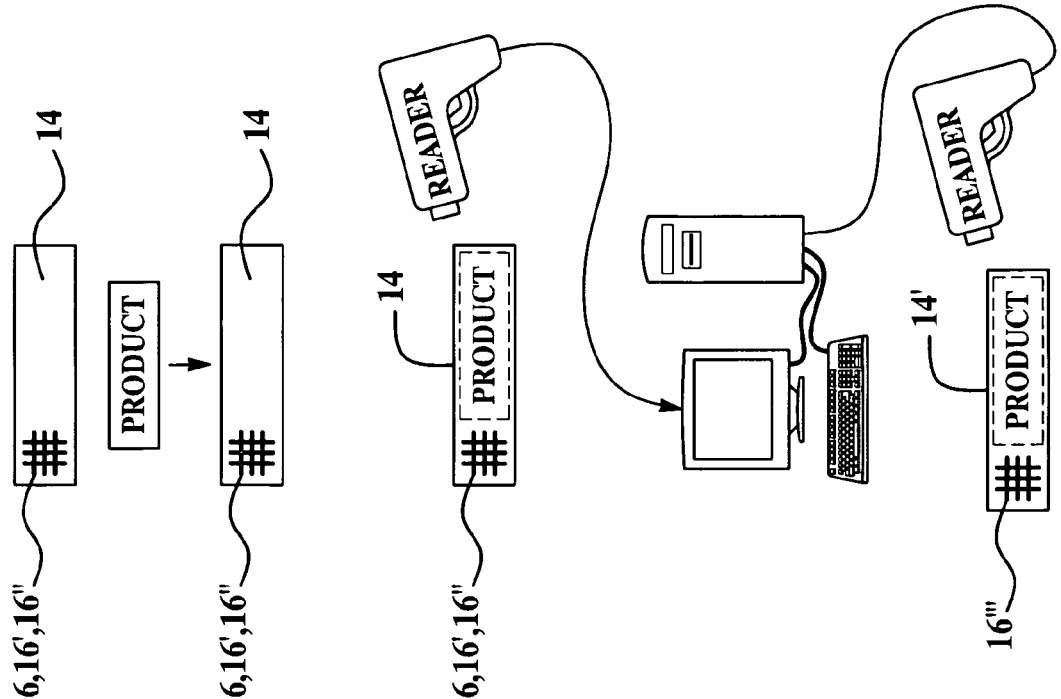
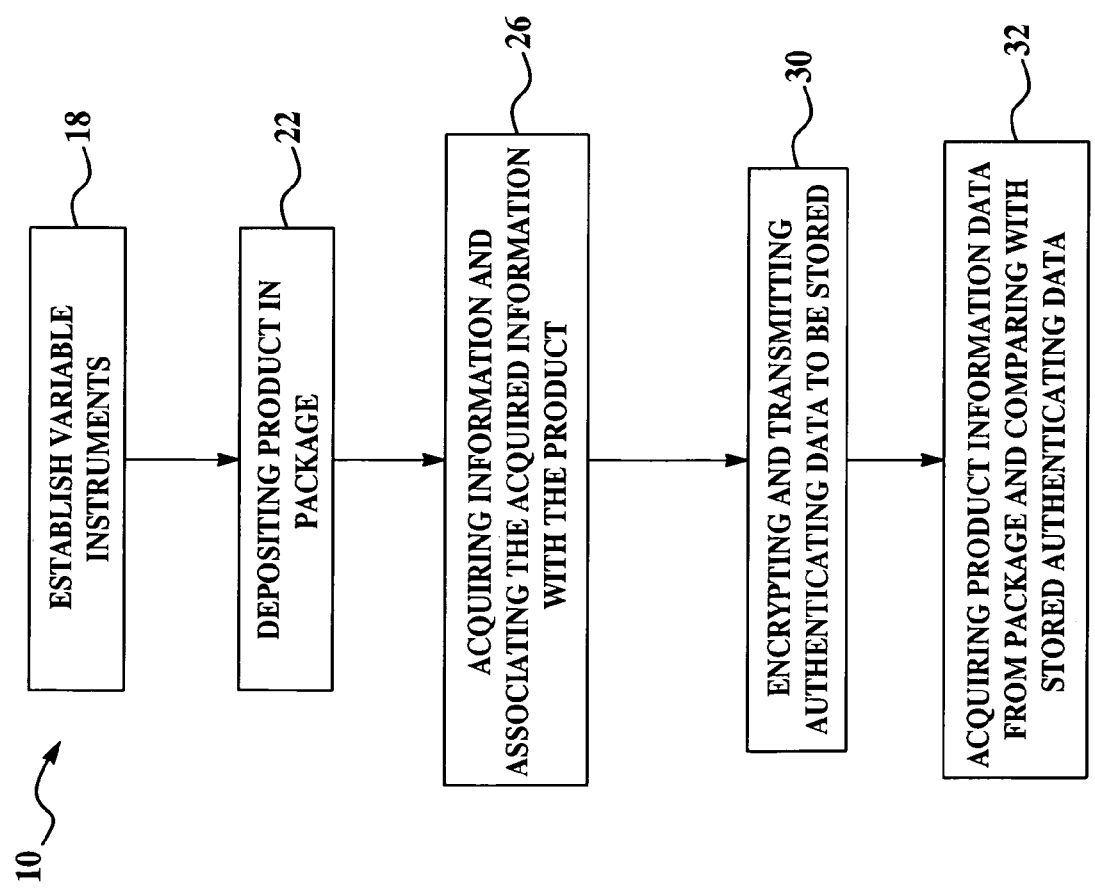

METHODS FOR MAKING AN AUTHENTICATING SYSTEM FOR AN OBJECT

BACKGROUND

The present disclosure relates generally to methods for making an authenticating system for an object.

Secure packaging is an important component of product tracking and authenticating, as well as anti-counterfeiting initiatives. Secure packaging involves commitment to two logical extremes: providing each package with a unique ID on the "authentication extreme" and providing tamper prevention on the "packaging protection extreme." Taken to these extremes, a package may contain a 1024-bit encrypted ID and may be made of adamant to ensure its safe and secure pathway through the supply chain. Production concerns, however, may make simultaneous achievement of these two goals difficult. Encrypting and anti-tampering instruments are often simultaneously brought to bear on the package. Coordinating printing, packaging, encoding, and authenticating technologies, as well as planning packaging runs to accommodate all of these technologies, may be complex, and thus may be impractical for many products, and for many organizations.

Many instruments used for authentication are printed as the package travels through the packaging/production line. Such instruments include 1-dimensional (1D) and 2-dimensional (2D) bar codes, printed serial numbers, and the like. Providing these instruments during the packaging may add significant complexity to the product assembly/packaging line, and may increase the amount of "waste" associated with a single exception event. "Waste" generally means that when a failure occurs, a set (e.g., multiple units) larger than the single unit/package (such as, for example, carton, box, pallet, lot, etc.) is affected by the failure. Such a system may also reduce the ability of a packaging company to outsource the production of an entire pre-printed package having authentication/security instruments in place.

As such, it would be desirable to provide an authentication system that obviates at least some of the complexities mentioned hereinabove.

BRIEF DESCRIPTION OF THE DRAWINGS

Objects, features and advantages will become apparent by reference to the following detailed description and drawings, in which like reference numerals correspond to similar, though not necessarily identical, components. For the sake of brevity, reference numerals having a previously described function may not necessarily be described in connection with subsequent drawings in which they appear.

FIG. 1A is a flow diagram depicting an embodiment of making an authenticating system for an embodiment of an object (e.g. a package);

FIG. 1B is a schematic diagram depicting an embodiment of making an authenticating system for an embodiment of an object (e.g. a package)

DETAILED DESCRIPTION

Figure 2:
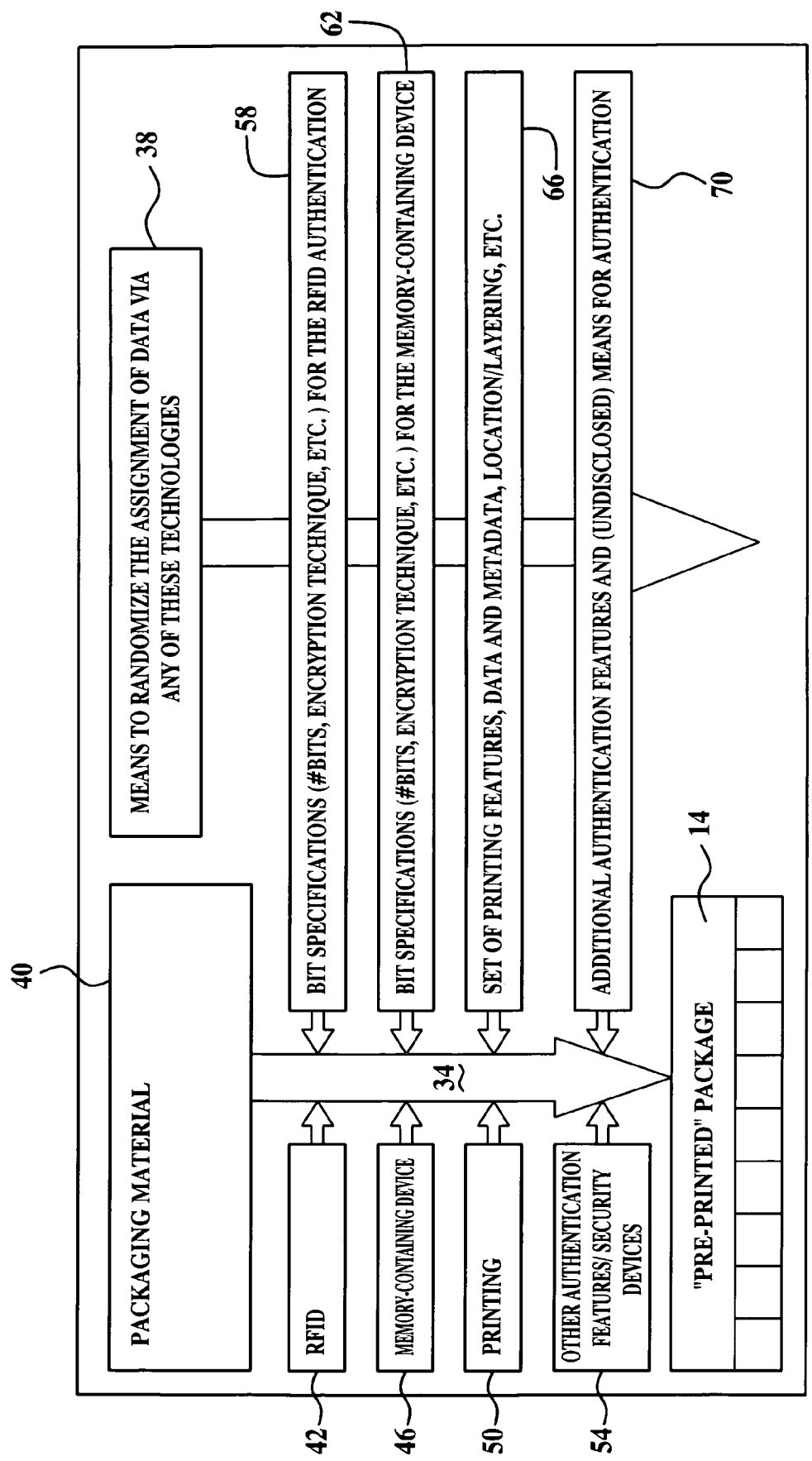
FIG. 2 is a flow diagram depicting an embodiment of a method of establishing a plurality of instruments (authenticating features, security devices, or combinations thereof) on an embodiment of an object (e.g. a package).

It is believed that embodiments as disclosed herein may remove much of the complexity associated with previous authenticating systems. This is accomplished, at least in part, by generating one or more of "ready-to-fill" or "ready-to-register" (e.g., with a database or registry) objects for the production line, whereby salient instruments are in place, thereby obviating the need for encryption, printing, encoding, and secure instrument printing when or after the object is packaged (or, where the object is a package, when or after a product is placed in/associated with the package).

Embodiments of the method and system disclosed herein have a substantial separation of (1) pre-packaging (encryption, printing, encoding, or instrument addition, or combinations thereof) and (2) packaging and in-line verification. This separates the package preparation/printing/securing from the production line, where product filling and authentication may occur. Such separation may also be advantageous for providing anti-tamper packages; for modularizing the overall packaging process (with many advantages in supply chain management and cost control); and for the addition of new instruments.

Furthermore, embodiments of the method and system may provide ubiquitous, robust authentication through the use of commercial-off-the-shelf (COTS) authentication acquisition/scanning technologies. The embodiments disclosed herein eminently support an "innate moving target" of packaging technologies, which may aid manufacturers in staying at least one step ahead of counterfeiters, and may enhance "divide by infinity" security.

Referring now to FIGS. 1A and 1B together, a flow diagram and a schematic diagram depicting an embodiment of a method of making an authenticating system 10 for an object 14 are shown. The method generally includes establishing a plurality of variable instruments 16 on the object 14, as depicted at reference numeral 18; depositing a product in the object 14 after the instruments 16 have been established thereon, as depicted at reference numeral 22; acquiring information from at least two of the plurality of instruments 16, as depicted at reference numeral 26; and associating the acquired information with the product to render product-specific authenticating data.

Further, it is to be understood that the product-specific authenticating data may also be a combination of product-specific authenticating data and instrument-derived authenticating data.

It is to be understood that the term "object" as used herein is to be interpreted broadly and may include, but is not limited to any type of object, product, or package. Likewise, the term "package" is to be interpreted broadly herein to include any unit for containing or displaying a product. Non-limitative examples of such packages include boxes, bags, containers, clamshells, bands, tape, wraps, ties, or the like, or combinations thereof.

An instrument 16 may include any suitable feature adapted to provide authentication, security or both. It is to be understood that the instruments 16 are variable and manifest one identifier out of a large series of identifiers. Examples of the plurality of instruments 16 include, but are not limited to graphical indicia, alphanumeric indicia, or combinations thereof. The instruments 16 may be formed of spectrally opaque ink, spectrally transparent ink, ultraviolet ink, infrared ink, thermochromatic ink, electrochromatic ink, electroluminescent ink, conductive ink, magnetic ink, color-shifting ink, quantum dot ink, phosphorescent ink, a guilloche, a planchette, holographs, security threads, watermarks, other security deterrents, anti-tamper deterrents, and combinations thereof.

The term "variable" instruments 16 is to be generally defined herein to mean that one or more instruments 16 on one object 14 is/are different than one or more instruments 16 on any other object 14. A more specific definition of "variable" as used herein means that there are a plurality of payloads (defined hereinbelow), and the same payload is not used over and over again, but rather is chosen from the range of the payload values.

As used herein, it is to be understood that the term "identifier(s)" is meant to mean information contained in the instrument(s) 16. The information may be, for example, a code; a sequence of bits, bytes, characters, numbers, etc.; a "payload;" or the like, or combinations thereof. A payload is usually a short (8-32 bit) message stored in the instrument(s) 16.

It is to be understood that the instruments 16 may include authenticating features 16', security devices 16", or combinations thereof, and that the instruments 16 may or may not be encrypted.

Yet further, it is to be understood that establishing the plurality of instruments 16 may be accomplished by any desired method suitable to establish the desired instrument 16 or combination of instruments 16 on the object 14. In a non-limitative embodiment, the establishing may generally be accomplished by any suitable printing processes. Non-limitative examples of suitable printing processes include offset printing, flexo printing, gravure printing, dry electrophotography, laser printing, liquid electrophotography, thermal inkjet printing, acoustic inkjet printing, piezoelectric inkjet printing, continuous inkjet printing, printing-associated manufacturing processes, metallic printing, intaglio printing, lenticular printing, somatosensory printing, olfactory printing, microprinting, print texturing, sandwich printing, or the like, or combinations thereof. In an embodiment, a printing-associated manufacturing process may include printing onto a specialized substrate, which may be adapted for a predetermined purpose, "finishing" the printing in a way to achieve a predetermined result, or combinations thereof.

In addition to strictly overt "readable" printing strategies, it is to be understood that printing may include other senses such as, for example, somatosensory (or "touch") in the case of layered printing, olfactory (or "smell") in the case of "scratch and sniff" printing, or combinations thereof. As a non-limitative example, the "smell" of the printing may be matched to the smell of the product in the printed object 14. Additionally, using different additives, pigments, and reagents in the ink, printing may provide a plethora of different overt instruments 16, whereby microprinting, variably opaque inks, and other technologies may likewise be used for covert authentication.

As previously stated, the instruments 16 are established "on" the object 14. As used herein, the phrase "on the object" may include establishing the instruments 16 on the surface of the object 14, establishing the instruments 16 so that they are partially or completely embedded in the object 14, establishing the instruments 16 on a tamper-evident or insertion card that is associated with the object 14, establishing the instruments 16 so that they have any other suitable arrangement, or combinations thereof.

Once the object 14 has the instruments 16 established thereon, a product may be deposited in, or associated with the object 14 (one example of which is a package). This may be accomplished by any suitable technique, depending, at least in part, on one or more of the size, shape, and configuration of the product to be packaged.

Acquiring information from the instruments 16 may be performed by any suitable means such as, for example, with a multi-modal reading device (it is to be understood that, as defined herein, "reading device," "reading," "read," or other like terms are meant to include any device or method suitable to acquire information from the instruments 16, such as by reading, scanning, polling, or the like, or combinations thereof), or via reading in multiple locations. The phrase "multi-modal," as referred to herein, refers to the device's ability to read information in more than one mode or format, such as may be required when scanning a plurality of instruments 16 embodied in more than one form, encrypted with more than one key (described further hereinbelow), or combinations thereof. A reading device is capable of performing multi-location driven reading, which may include two or more consecutive visual scans.

The acquired information may then be associated with the product to render the product-specific authenticating data. Some non-limitative examples of acquired information include variable bits off an RFID (e.g., security device 16"), a payload from an authenticating feature 16', or any other intentional information placed into instruments 16 in whatever form (electronic, printed, etc.). Some information from the product that may be associated with the acquired information may include product-identifying information (non-limitative examples of which include product name, size, color, manufacturer, dosage, ingredients, identification numbers, serial numbers, universal bar codes (UBC), lot number, expiry date, or the like, or combinations thereof). Product-identifying information may also be present and tracked without being linked to the other deterrents or instruments 16. In an embodiment, the non-linked product-identifying information may be added to the registry substantially simultaneously or sequentially with the linked product-identifying information acquired from the instruments 16.

It is to be understood that the production site may have no control over the association of the acquired information with the pre-established instruments 16 on the object 14. As such, instruments 16 may be established independent of the production line, as well as independent of each other.

In an embodiment, the method further includes encrypting the product-specific authenticating data and transmitting the encrypted product-specific authenticating data to a record, as depicted at reference numeral 30. The product-specific authenticating data may be encrypted by a reading device, such as a multi-modal reading device, prior to transmitting the data to a record. In other embodiments, the product-specific authenticating data may be encrypted by symmetric/asymmetric encryption, mass serialization, randomized identifiers, or combinations thereof. As a non-limitative example, the record may be stored in a secured server or registry. The record may also be adapted for retrieval from the secured server or registry when product authentication is desired.

In yet another embodiment, the method further includes reading at least one of a plurality of instruments 16''' on a package 14' to render product information data (it is to be understood that the product information data may or may not be authentic), as shown at reference numeral 32. A comparison may then be made between the product information data and the product-specific authenticating data. After such a comparison is made, the authenticity of the product may be determined. It is to be understood that an end user may read at least one of the plurality of instruments 16''' on the package 14' to render the product information data and determine the authenticity. The term "user" as defined herein may include any person who desires to authenticate the product. It is to be understood that once the product-specific authenticating data is stored, the authenticity of the package 14' may be checked at any point in time. As such, a user may be the distributor, retailer, consumer, or the like.

As a non-limitative example, the product information data may be retrieved by scanning at least one of the plurality of instruments 16''' with a scanning device (such as, for example, a multi-mode scanning device). Next, the product-specific authenticating data, which may be stored in a record, may be retrieved for the particular product. The product-specific authenticating data may then be compared to the product information data. Upon comparison, if the product-specific authenticating data matches the product information data, a user may receive notice of authenticity of the product. Conversely, if the product-specific authenticating data does not match the product information data, a user may receive notice of non-authenticity.

In an embodiment of the method of making an authenticating system 10 for an object 14, a plurality of instruments 16 are established on the object 14 so that each of the plurality of instruments 16 may be related to one or more of the other of the plurality of instruments 16 in a predetermined manner. As referred to herein, the phrase "predetermined manner" means that the instruments 16 are positioned, and may be encrypted, so that at least one of the instruments 16 is related to at least another of the instruments 16. It is to be further understood that the term "predetermined" as used herein is meant to include the use of dynamic establishing of instrument(s) 16, e.g. a serial number, which changes with each product, may be established as one of the instruments 16, and may relate to one or more other instruments 16 in a desired manner. In an embodiment, an example of a desired or predetermined manner includes substantially all of the instruments 16 being randomly and independently established, and then being associated as they travel through the production line. Yet further, it is to be understood that the relation between the instruments 16 may be adapted to render object-specific authenticating data.

"Random," "randomly," or like terms as defined herein refer to a seemingly random selection among the plurality of payloads. For a "payload campaign," the complete subset of payloads (out of a much larger set of all possible payloads) is determined that will be associated with the objects that are to be chosen through some mechanism. One such mechanism is mass serialization (where from 1 to the RANGE_END is counted), but generally, these numbers may be encrypted so that they "appear" randomly assigned. Another such mechanism is to actually randomly assign the numbers; that is, select the payloads one after another using a random payload generator uniform (or apparently uniform) over the RANGE.

The method may also include establishing an orthogonal instrument on the object 14, wherein the orthogonal instrument provides a key of the predetermined manner in which each of the plurality of instruments 16 relate. As used herein, the term "orthogonal instrument" refers to an independently varying identifier encoded in a domain physically distinct from the instruments 16, such as, for example, magnetic light as opposed to visible light, ultraviolet (UV) light, varying chemical compositions, or combinations thereof. The orthogonal instrument may or may not be encrypted.

It is to be understood that the key may be embedded in the orthogonal instrument at any suitable time. In an embodiment, the key is embedded in the orthogonal instrument subsequent to establishing the orthogonal instrument on the object 14. In another embodiment, the plurality of instruments 16 and the orthogonal instrument are established on the object 14 substantially simultaneously or sequentially, and then the key is embedded in the orthogonal instrument. In still another embodiment, the key may be embedded in all of the previous instruments, in which case all of the previous instruments should generally be read so as to decode/interpret the key.

This embodiment of the method may further include decoding the key from the orthogonal instrument. The decoded key may then be used to relate each of the plurality of instruments 16 in the predetermined manner, thereby rendering the object-specific authenticating data. In an embodiment, a reading device may be used to decode the key, which may then be used to determine whether the instruments 16 are correctly disposed in the predetermined manner. It is to be understood that instruments 16 that do not relate or are not disposed in the predetermined manner may be indicative of the non-authenticity of the object 14 or may be intentionally ignored, whereby they may be recorded without being linked, as previously described.

It is contemplated that one of the plurality of instruments 16 may contain an error. In an embodiment, an error in one of the plurality of instruments 16 generally does not interfere with authentication of the object 14. Additionally, error code checking (ECC) may be used to make or substantially ensure that the individual and hashed instruments 16 will be more robust to authentication than any errors, so that errors do not substantially interfere with authentication.

Still another embodiment of a method of making the authenticating system 10 includes layering the plurality of instruments 16 on the object 14. As used herein, "layering" is defined as at least a portion of one of the plurality of instruments 16 being established over or under at least a portion of another of the one or more instruments 16. As such, any number of the plurality of instruments 16 may be layered on a single object 14. Layering may also be accomplished by establishing two or more of the plurality of instruments 16 on a predetermined target of the object 14. Additional embodiments utilizing layering are further described hereinbelow.

In an embodiment, a security device instrument(s) 16' may be established on the object 14. The security device instrument(s) 16' may, as non-limitative examples, be selected from an RFID chip, an optically variable device, a diffractive optical variable image device (DOVID), an interface security image structure (ISIS), a hologram, tamper-resistant instruments, smart packaging, a global positioning satellite (GPS) device, or the like, or combinations thereof. It is to be understood that smart packaging may include chip-based information recorded on the package. Additionally, a GPS device may include a GPS recorder, a GPS transceiver, or combinations thereof.

Yet further, a method of making an authenticating system 10 may include establishing at least one decoy instrument on the object 14. In an embodiment, the decoy instrument(s) is printed onto the surface of the object 14. It is to be understood that a decoy instrument may appear to be an authenticating feature instrument 16' when, in reality, it contains no authenticating capabilities. A decoy instrument may also be capable of providing authenticating capabilities, but is not used in a particular authenticating system 10. As such, in an embodiment, the primary (or sole) purpose of a decoy instrument is to evade a potential counterfeiter, to allow for the nature of the authentication to be altered without changing the in-place instruments, or combinations thereof.

Referring now to FIG. 2, a flow diagram depicting an embodiment of a method of establishing a plurality of authenticating feature instruments 16', security device instruments 16", or combinations thereof on an object 14 is shown. It is to be understood that packaging material 40 may have any combination of authenticating feature instruments 16' and security device instruments 16" established on it, some non-limitative examples of which are shown in FIG. 2, e.g. security device instrument RFID 42, security device instrument memory-containing device 46, authenticating feature instrument printing 50, or any other instruments 16 or combination of authenticating feature instruments 16' and security device instruments 16", as depicted at 54. The establishing of the various instruments 16 renders a pre-established package 14 (one example of which is a pre-printed package 14). In other words, the method generally includes establishing a plurality of authenticating feature instruments 16', security device instruments 16", or combinations thereof in a substantially sequential manner on a packaging material 40 (non-limitative examples of which include paperboard, cardboard, paper, plastic, fabric, or the like, or combinations thereof), as depicted at reference numeral 34. It is to be understood, however, that the plurality of authenticating feature instruments 16', security device instruments 16", or combinations thereof may alternately be established in a substantially simultaneous manner.

To the right of the establishing steps shown in FIG. 2 is shown another embodiment of the method in which assignment of the data is randomized via various technologies, as depicted at reference numeral 38. It is to be understood that these technologies may be specific to the instrument 16. For example, the following instruments 16 may be randomized in the following ways. If an RFID 42 is established, bit specifications (e.g., number of bits, encryption technique, etc.) suitable for use with RFID 42 is used to randomize the assignment of data, as depicted at reference numeral 58. If a preprogrammed/interactive memory-containing device 46 is established, bit specifications suitable for use with memory-containing device 46 is used to randomize the assignment of data, as depicted at reference numeral 62. If printing 50 is established, the set of printing features, data, metadata, location, layering, etc. or combinations thereof are used to randomize the assignment of data, as depicted at reference numeral 66. If other authenticating feature instruments 16', security device instruments 16", or combinations thereof are established, as depicted at 54, additional authentication instruments 16 and (undisclosed) means for authentication are used to randomize the assignment of data, as depicted at reference numeral 70.

Referring generally now to FIGS. 1A, 1B and 2 together, implementation of such methods for making the authenticating system(s) 10 results in several security-related and authentication-related consequences described hereinbelow.

An embodiment of a "campaign," or a plan for sequencing through substantially all of the possible representations of an authenticating/securing technology, requires both an accounting and a sequencing mechanism. A simple accounting mechanism includes allowing the assignment to be completely random, which may also determine the sequencing (that is, the random order is the sequencing through the possibilities). More simply, an encrypting technique itself may be used to provide the output, which may appear "randomly sequenced" due to the modulus-based encryption technologies. In another embodiment, the accounting mechanism includes allowing the assignment to be effectively random, using a random kernel hashed with data (such as, for example, time, location, etc.). Regardless, the campaign may be determined by the manufacturer, which may substantially prevent a supplier from reproducing the same pattern(s) over and again. Alternatively, a vanishingly small percentage of replicates may be allowed, assuming the other random processes are likewise engineered.

In some instances, the exact accounting and sequencing mechanisms may be of less importance than the purpose thereof. For example, one purpose is to prevent a producer from undesirably "biasing" the identifiers, instruments 16, or both. Thus, randomness-assessing algorithms may be utilized to "qualify" a shipment. If two or more producers of identifiers are utilized, each using a randomness (or similar) approach, then the supply chain may be effectively divided, since any one identifier/deterrent provider may be unable to reverse engineer the deterrent campaign.

Printing technologies may be an important part of an "innate moving target" of anti-counterfeiting protection methods since the combination of covert, overt, and decoy printing technologies may be readily changed from one print job to the next. As such, the possibilities in printing are virtually unlimited. A preprogrammed/interactive memory-containing device offers a similar capability, since its large memory size allows changing the assignment of different sections of memory to encryption, provenance, data, metadata, and the like, from one campaign to the next.

To provide "divide by infinity" security, the information that is encrypted/encoded in any of the salient technologies (which may include printing, RFID, a preprogrammed/interactive memory-containing device, or the like, or combinations thereof) may be created in any desired random manner. It is to be understood that such "randomness" may be generated via encrypted sequential numbering. As such, the sequencing of the data need not be random to ensure random package 14 appearance. This randomization may be managed in a number of different ways, such as, for example, a manufacturer may specify the means of generating the randomized population of packaging instruments 16.

As a non-limitative example of "divide by infinity" security, 72 bits in RFID are used for authentication ($4.7 \times 10^{21}$ possible bit codes). If printing technologies provide, for example, another $10^{20}$ possibilities and about 3200 bits of a preprogrammed/interactive memory-containing device are utilized, then these three technologies, in combination, provide approximately $10^{1000}$ different unique instruments 16. As such, for a product produced in the billions, there will be less than a 1 in $10^{950}$ chance that a particular instrument 16 will be authentic. Furthermore, by having each product authenticated on the packaging line, the overhead may be decreased by a few kB of storage for each object 14. It is to be understood that identifiers may not be stored until after the instruments 16 are associated with the product, which may be after the object 14 travels through the production line. It is also contemplated that storing the identifiers after production may substantially reduce the potential for insider hacking, since no authenticating information is in the registry until it is scanned.

It is to be understood that the same, similar, or different reading technologies may be used on the packaging line and in an authentication device. As such, in an embodiment, the object 14 may be authenticated at any position in the supply chain. Therefore, it may be preferred for the acquisition/scanning device to incorporate, when possible, commercial-off-the-shelf (COTS) authentication acquisition/scanning technologies.

Many print technologies may be evaluated before being implemented on a package 14. If each print technology used in a particular system 10 is independent of the others used, then the overall number of possibilities for the final printed package 14 is the product of each individual print technology. As such, if print technology "k" produces "$N_k$" "six-sigma" different possibilities, then for "M" print technologies, the number of unique identifiers in the compound authenticating instrument 16 combinations will be $\pi_k(N_k)$ (it is to be understood that in the equation $\pi$ is for k=0 . . . M (i.e., all $N_k$ multiplied together for k=0 . . . M)).

As a non-limitative example, if there are 30 different rectangular hue targets with six-sigma distinguishability; 20 distinguishable Modulation Transfer Function (MTF) (used for scanning quality assurance) pattern sets, 10 different line thicknesses, 100 different relative locations of two targets, and 10 different grades of "black" for targets, and each technique is independent, then there are 30*20*10*100*10, or 6 million, different combinations of these technologies. It is to be understood that since "six-sigma" implies approximately 3.4 mistakes per million occurrences, from the perspective of independent samples, as little as approximately 20 mistakes may be expected out of the set of 6 million combinations. However, there is a 1 in 1,000 probability of having one package 14 in a set of six million having two simultaneous mistakes. Furthermore, at six-sigmas, the odds of having two of six independent metrics fail on a single package is approximately $180 \times 10^{-12}$.

In another embodiment of combining/layering print techniques, two inks with the same visible color (but different spectral response to infrared or UV light) are used for target patterns such as, for example, a Macbeth target, which is a 2-dimensional pattern containing many colors, presumably for testing the color gamut of a printing/scanning system that may be used to test color calibration, consistency, and gamut. Additionally, targets may be used for multiple sets of data. For example, a MTF pattern may be set with different low-resolution and high-resolution targets (such as, for example, sinusoidal MTF targets having different frequencies). Such an MTF pattern may be verified using the horizontal number of lines, vertical number of lines, horizontal line resolution, vertical line resolution, the ratio(s) of these values, or combinations thereof. As such, a single target may provide multiple sets (and a "moving target") of data.

Since any combination of overt, covert, and decoy technologies (working or purposely non-working) may be brought to bear on a given object 14, the cost of packaging may be delimited by upper and lower ranges at the design stage. As such, it may be preferred, for example, to use more sophisticated (potentially more expensive) overt technologies for relatively higher-value products.

An embodiment having layered instruments 16 includes a combination of one or more of the following six instruments: (1) infrared/ultraviolet fluorescent ink; (2) infrared opaque and transparent black (and other colored) ink; (3) ink containing a taggant; (4) magnetic ink; (5) inks with differential adhesive properties to enable sandwich printing; and (6) visible ink.

Generally, (1), (2) and (4) are covert instruments, (5) and (6) are overt instruments, and (3) is a forensic instrument. However, it is to be understood that (2) may be forensic if specialty pigments are used; (5) may be covert when allowing a separate security strategy above and below the separating layer; and (6) may provide forensic-level protection in combination with the other instruments through "effectively infinite" variation. Furthermore, it is to be understood that using any combination of the six instruments may provide forensic-level protection through the "effectively infinite" permutations. Each instrument is described in greater detail hereinbelow.

(1) Infrared/Ultraviolet Fluorescent Inks

UV-fluorescing pigments are available in at least red, green, and blue (RGB) emission chroma. UV inks may be printed above visible inks and, because they fluoresce at wavelengths outside the visible range, may be scanned/read separately from the underlying (and independent) visible pattern.

(2) Infrared Opaque and Transparent Black (and Other Colored) Inks

One or more of infrared and ultraviolet ("invisible") inks may be printed beneath visible targets. This may offer an additional deterrent to (1) since the same ink pattern above may be used to differentially obscure parts of the UV ink printed below. As non-limitative examples, (1) and (2) may be used simultaneously under at least the following circumstances:

a) They fluoresce at different, minimally-overlapping, and known wavelengths;

b) They are applied to distinct (non-overlapping) portions of the overall authenticating/security instruments 16, 16', 16" (such as, for example, one side uses UV/IR overprinting, the other side uses differential opaque/transparent ink printing); and c) Their effects are complementary/additive. As a non-limitative example, one technology may use "|", the other to use "–", such that they combine to form the pattern "+". As such, if the first technology is 10011001 and the second is 00001111, then the resulting scanned information is "|", blank, blank, "|", "+", "–", "–", "+". Which of the two technologies used at each location is evident from this pattern, and thus provides two levels of authentication (which may be linked as described further hereinbelow).

(3) Ink Containing a Taggant

Inks may be laced with taggants/microtaggants, which may include dynamic instruments that may be updated to evade counterfeiting. In an embodiment, the pigments are varied from run to run. Taggants may be environment reactive, for example, to light, temperature, humidity, scratches, or the like, or combinations thereof. Non-limitative examples of taggants include DNA, RNA, special organometallics, pigment variants, nanoparticles, and the like, or combinations thereof. As a non-limitative example, DNA and stenography technologies may be combined to hide DNA code into an ink. The DNA code cannot likely be discovered/identified without a key, causing it to be highly counterfeit-resistant.

(4) Magnetic Ink

Magnetic inks may be considered "covert" in the sense that a user cannot see them. However, magnetic ink character recognition (MICR) solutions are often used for checks and other important documents. It is contemplated that magnetic ink may be added to other inks without interfering with the individual instruments, such as, for example visibility, UV/IR, taggants, or combinations thereof, and thus, may offer another independent axis for authentication. In another embodiment, overprinting may be performed, whereby MICR may be printed onto the substrate and then printed over with one or more layers by the Indigo Press (i.e. a digital press capable of printing up to 16 layers). In an embodiment, it is asserted that the MICR will be readable even beneath the 16 layers of Indigo ink.

(5) Inks with Differential Adhesive Properties to Enable Sandwich Printing

An embodiment of sandwich printing enables an independent approach to the instrument 16 both above and below the separating layer of the sandwich print. As such, two different authenticating feature instruments 16'/security device instruments 16" may be effectively "stacked" one over the top of the other. As a non-limitative example, if the separating layer is ink having a UV/IR absorbent instrument, then the layers above and below the separating layer may have independent instruments, which may be selected from (1)-(4), (6), or combinations thereof.

In an embodiment of sandwich printing, an industrial press may print up to 16 layers of ink on a substrate in a single pass in substantially perfect registration. These layers may effectively be used as a 'front' design, a 'back' design, and as a (preferably opaque) separating layer therebetween. As such, a layered design may be printed on a transparent substrate whereby two images are created, each visible from one side of the substrate.

The separating/opaque layer of ink (which is white in an embodiment) sandwiched between the 'front' and 'back' designs may serve two purposes: it may provide the side that is currently viewed with a background, it may hide the layer that is behind the separating layer, or combinations thereof. It is to be understood that the separating layer of ink may consist of multiple layers of one or more of transparent, translucent, semi-opaque, and opaque ink to achieve one or more of a suitable color or opacity. In an embodiment, a layer of opaque separating ink includes from about three to about four actual ink layers.

In an embodiment, sandwich printing may be utilized to stack two instruments 16, one on top of the other. As such, the lower of the two instruments 16 (i.e., the lower layer) may be revealed as the upper of the two instruments 16 (i.e., the top layer) is removed.

(6) Visible Inks

In an embodiment, an instrument 16 is provided that has a plurality of overt color tiles. Microtext may be printed in one or more of the overt color tiles. Generally, each of the tiles may be linked to the microtext printed therein (e.g., in a middle portion). The microtext sequences themselves may provide a covert protection instrument by associating the microtext with the product and storing the authenticating data in a record. In another embodiment, quantum dots or phosphorescent inks may be utilized to add "interest" or aesthetically pleasing effect to the overt instruments.

Referring more generally to all of the instruments 16 disclosed herein, in an embodiment, inks with different adhesive properties (5) may be used to "glue" other instruments 16 together. As such, one modality may be the effective lynchpin for the overall campaign strategy and for linking the other deterrents together.

As a non-limitative example of an authenticating system 10, 8 bits of information are encoded in a 5×4 MICR array (with 14 MICR characters, which results in 280 MICR outputs) as follows: bits 1-5 indicate which of each of the instruments (1)-(4) and (6) is actually "active" for authentication (as opposed to being a decoy), and the other bits are used for parity/error checking. Thus, the MICR may be used to mark which of the other technologies are active. Since the MICR may be read independently of the other instruments, it is possible to determine, for example, the following: if sandwich layers are present, if UV/IR data is available to be read, if a taggant should be used for authentication, or combinations thereof. Since the MICR may be used for more than just the 5 bits, additional instruments 16 (for example, authentication feature instruments 16', security device instruments 16", or combinations thereof) may be added to the overall instrument 16 as desired. For example, excess MICR ink bits may digest or replicate, for example, RFID, bar code bits, or combinations thereof, as desired.

As such, an embodiment of an overall instrument 16 combines an overt-covert feature with two types of invisible (UV/IR) instruments, which together may include one or more of taggants or "sandwich" printing separators. MICR may be used to indicate which instruments 16 may be analyzed for a given target. Thus, in an embodiment, a MICR reading may be followed by analysis with a visible scanner, a UV/IR scanner, a taggant scanner, or combinations thereof. Furthermore, each of sandwich separation and analysis may be performed manually.

It is to be understood that the instruments 16 may be linked to one another through any suitable means. As a non-limitative example, the MICR plane may be used to determine how the other instruments 16 are linked/associated with one another. As such, the MICR (or other) individual instrument 16 may be used to signify the way in which the other instruments 16 link together, such as, for example, if the sequence in instrument 1 is encrypted to yield the sequence in instrument 2. As another non-limiting example, if the MICR density (sequence length) includes 20 bits per overall instrument, and 8 bits are used to encode the links (wherein 5 may be used to indicate which instruments 16 to track, and another 7 may be used, for example, for parity/error checking), then:

Bit 1: Sequential encryption/independent encryption; and

Bits 2-8: Order of sequential encryption/independent encryption.

As such, Bit 1 indicates whether each individual instrument 16 is independent or whether they are sequentially encrypted. Bits 2-8 provide the order of the sequence (since five instruments may provide 5!, or 120, possible sequences, 7 bits may be used to encode them all). Furthermore, the encryption may be performed with a user's private key using standard (such as, for example, RSA) encryption approaches.

Embodiments of the authentication system 10 described herein are advantageous over existing single-approach print instruments, at least in part because they incorporate multiple technologies substantially simultaneously, while also allowing for new technologies to be added over time. Additionally, the authenticating feature instrument(s) 16'/security device instrument(s) 16" described herein may be "dedicated" security instrument(s) such that, unlike bar codes and other covert security device instruments, its entire purpose is for security, rather than for branding, tracking and tracing, anti-tampering, or combinations thereof. Such a dedicated instrument 16 may allow additional print technologies, forensic technologies, or combinations thereof to be readily included into the instrument 16 without substantial concern for its effect on branding, track and trace readability, or the like, or combinations thereof.

It is to be understood that the embodiments disclosed herein may be adapted for use in a variety of applications and with a variety of products such as, for example, secure documents, replacement parts, consumer package goods, electronic file headers, substantially any branded, printed material, or the like. In a non-limitative example, the product is a pharmaceutical product. As such, the object 14 may be a pharmaceutical package, may be adapted to provide one or more of security and authentication for the pharmaceutical product, or combinations thereof.

While several embodiments have been described in detail, it will be apparent to those skilled in the art that the disclosed embodiments may be modified. Therefore, the foregoing description is to be considered exemplary rather than limiting.

What is claimed is:

1. A method for making an authenticating system for an object, the method comprising:

establishing, via a printer, a plurality of variable instruments on the object, each of the plurality of variable instruments having a different identifier including a plurality of payloads, the identifier being independent of any particular product and remaining unstored until being associated with information from some product;

depositing a product in the object after the instruments have been established on the object;

acquiring, via a reading device, information, including one of the plurality of payloads, from at least two of the plurality of variable instruments;

associating the acquired information with information from the product to render product-specific authenticating data; and storing, via a computer system, the product-specific authenticating data;

wherein at least one of the plurality of variable instruments on the object is different from at least one of the plurality of variable instruments on an other of the objects;

and wherein the one of the plurality of payloads is chosen from a range of payload values.

2. The method of claim 1 wherein storing the product-specific authenticating data includes:

encrypting the product-specific authenticating data; and transmitting the encrypted product-specific authenticating data to a record.

3. The method of claim 2, further comprising:

reading at least one of the plurality of variable instruments on the object to render product information data; and receiving information regarding authenticity of the product after comparison of the product information data to the product-specific authenticating data.

4. The method of claim 2 wherein the record is stored in a secured server or registry.

5. The method of claim 1 wherein one or more of the plurality of instruments includes graphical indicia, alphanumeric indicia, or combinations thereof.

6. The method of claim 1 wherein at least one of the plurality of instruments comprises a security device, the security device selected from an RFID chip, an optically variable device including an iridescent ink, a diffractive optical variable image device, an interface security image structure, a hologram, tamper-resistant instruments, smart packaging, a global positioning satellite device, and combinations thereof.

7. The method of claim 1 wherein at least one of the plurality of instruments is encrypted.

8. The method of claim 1 wherein the establishing is accomplished by printing with the printer, and wherein the printing is accomplished by offset printing, flexo printing, gravure printing, dry electrophotography, laser printing, liquid electrophotography, thermal inkjet printing, acoustic inkjet printing, piezoelectric inkjet printing, continuous inkjet printing, printing-associated manufacturing processes, metallic printing, intaglio printing, lenticular printing, somatosensory printing, olfactory printing, sandwich printing, microprinting, print texturing, or combinations thereof.

9. The method of claim 1 wherein the plurality of instruments is layered on the object.

10. A method for making an authenticating system for an object, the method comprising:

establishing, via a printer, a plurality of variable instruments on the object, each of the plurality of variable instruments including a different identifier that is independent of any particular product and remains unstored until being associated with information from some product;

printing at least one decoy instrument onto the object;

depositing a product in the object after the instruments have been established on the object;

acquiring, via a reading device, information from at least two of the plurality of variable instruments;

associating the acquired information with information from the product to render product-specific authenticating data;

storing, via a computer system, the product-specific authenticating data.

11. The method of claim 1 wherein the identifier of at least one of the plurality of variable instruments includes a randomly assigned identifier.

12. A method for making an authenticating system for an object, the method comprising:

establishing, via a printer, a plurality of variable instruments on the object, each of the plurality of variable instruments including a different identifier that is independent of any particular product and remains unstored until being associated with information from some product;

establishing the plurality of variable instruments on the object such that each of the plurality of variable instruments is related to each other of the plurality of variable instructions in a predetermined manner, the relation adapted to render object-specific authenticating data;

establishing an orthogonal instrument on the object, the orthogonal instrument adapted to provide a key of the predetermined manner in which each of the plurality of instruments relate;

depositing a product in the object after the instruments have been established on the object;

acquiring, via a reading device, information from at least two of the plurality of variable instruments;

associating the acquired information with information from the product to render product-specific authenticating data; and storing, via a computer system, the product-specific authenticating data.

13. The method of claim 12 wherein one of the plurality of variable instruments contains an error.

14. The method of claim 12, further comprising:

decoding the key from the orthogonal variable instrument; and using the key to relate each of the plurality of variable instruments in the predetermined manner, thereby rendering the object-specific authenticating data.

15. The method of claim 14, further comprising receiving notice of non-authenticity of the object when, upon using the key, each of the plurality of variable instruments do not relate in the predetermined manner.

16. The method of claim 1 wherein the object is a package adapted for the product.

17. The method of claim 12 wherein the plurality of variable instruments is layered.

18. The method of claim 12 wherein at least one of the plurality of variable instruments includes spectrally opaque ink, spectrally transparent ink, ultraviolet ink, infrared ink, thermochromatic ink, electrochromatic ink, electroluminescent ink, conductive ink, magnetic ink, color-shifting ink, quantum dot ink, phosphorescent ink, a guilloche, planchettes, holographs, security threads, watermarks, security deterrents, anti-tamper deterrents, or combinations thereof.

19. The method of claim 12 wherein at least one of the plurality of variable instruments comprises a security device, the security device selected from an RFID chip, an optically variable device, a diffractive optical variable image device, an interface security image structure, a hologram, tamper-resistant instruments, smart packaging, a global positioning satellite device, and combinations thereof.

20. The method of claim 12 wherein the orthogonal instrument, at least one of the plurality of instruments, or combinations thereof is encrypted.

21. The method of claim 12 wherein the establishing steps are accomplished by printing via the printer, and wherein the printing is accomplished by offset printing, flexo printing, gravure printing, dry electrophotography, laser printing, liquid electrophotography, thermal inkjet printing, acoustic inkjet printing, piezoelectric inkjet printing, continuous inkjet printing, printing-associated manufacturing processes, metallic printing, intaglio printing, lenticular printing, somatosensory printing, olfactory printing, microprinting, print texturing, or combinations thereof.

22. The method of claim 12, further comprising establishing at least one decoy instrument onto a surface of the object.

23. The method of claim 12 wherein the identifier of at least one of the plurality of variable instruments includes a randomly assigned identifier.

* * * * *